United States Patent
Kaneko et al.

(10) Patent No.: US 11,814,717 B2
(45) Date of Patent: Nov. 14, 2023

(54) PALLADIUM PLATING SOLUTION AND PLATING METHOD

(71) Applicant: C. Uyemura & Co., Ltd., Osaka (JP)

(72) Inventors: Yohei Kaneko, Osaka (JP); Yuhei Oogami, Osaka (JP); Katsuhisa Tanabe, Osaka (JP); Tsuyoshi Maeda, Osaka (JP)

(73) Assignee: C. Uyemura & Co., Ltd., Osaka (JP)

( * ) Notice: Subject to any disclaimer, the term of this patent is extended or adjusted under 35 U.S.C. 154(b) by 0 days.

(21) Appl. No.: 17/219,709

(22) Filed: Mar. 31, 2021

(65) Prior Publication Data

US 2021/0310127 A1 Oct. 7, 2021

(30) Foreign Application Priority Data

Apr. 3, 2020 (JP) ................ 2020-067193

(51) Int. Cl.
| | | |
|---|---|---|
| *C23C 18/44* | (2006.01) | |
| *B32B 15/01* | (2006.01) | |
| *C25D 3/50* | (2006.01) | |
| *C08K 3/11* | (2018.01) | |
| *C08K 5/09* | (2006.01) | |
| *C08K 5/17* | (2006.01) | |
| *C08K 5/36* | (2006.01) | |

(Continued)

(52) U.S. Cl.
CPC ............ *C23C 18/44* (2013.01); *B32B 15/018* (2013.01); *C08K 3/11* (2018.01); *C08K 5/09* (2013.01); *C08K 5/17* (2013.01); *C08K 5/36* (2013.01); *C08K 5/372* (2013.01); *C25D 3/50* (2013.01); *C08K 2003/3009* (2013.01)

(58) Field of Classification Search
None
See application file for complete search history.

(56) References Cited

U.S. PATENT DOCUMENTS 4,804,410 A * 2/1989 Haga .................. C23C 18/44
106/1.23
7,678,183 B2 * 3/2010 Murasumi ........... C23C 18/1651
106/1.24

(Continued)

FOREIGN PATENT DOCUMENTS

| EP | 0698130 | 4/1997 |
|---|---|---|
| JP | S62124280 A | 6/1987 |

(Continued)

OTHER PUBLICATIONS

JP 11269658 A, Oct. 1999, Machine translation (Year: 1999).*

*Primary Examiner* — Satya B Sastri
(74) *Attorney, Agent, or Firm* — David R. Stevens; Stevens Law Group

(57) ABSTRACT

The purpose of the present invention is to provide a palladium plating solution and a plating method for improving a bath stability of a palladium plating, without decreasing a deposition property of the palladium plating. A palladium plating solution for improving a bath stability, without decreasing a deposition property, comprising: an aqueous palladium compound: one or more complexing agent containing a compound having at least an ethylenediamine or a propylenediamine skeleton; a formic acid or a formate; and a sulfur compound, wherein the palladium plating solution is having two or more sulfide groups in a molecule of the sulfur compound.

7 Claims, 1 Drawing Sheet

(51) Int. Cl.
   *C08K 5/372* (2006.01)
   *C08K 3/30* (2006.01)

(56) References Cited

U.S. PATENT DOCUMENTS

| | | | |
|---|---|---|---|
| 7,704,307 B2 * | 4/2010 | Aiba | C23C 18/44 |
| | | | 427/443.1 |
| 8,562,727 B2 | 10/2013 | Watanabe | |
| 9,401,466 B2 * | 7/2016 | Walter | C23C 18/1651 |
| 2017/0121823 A1 | 5/2017 | Suchentrunk et al. | |

FOREIGN PATENT DOCUMENTS

| | | | |
|---|---|---|---|
| JP | H11269658 | | 10/1990 |
| JP | 11269658 A | * | 10/1999 |
| JP | 3972158 B2 | | 9/2007 |
| WO | 2007/102644 | | 9/2007 |

* cited by examiner

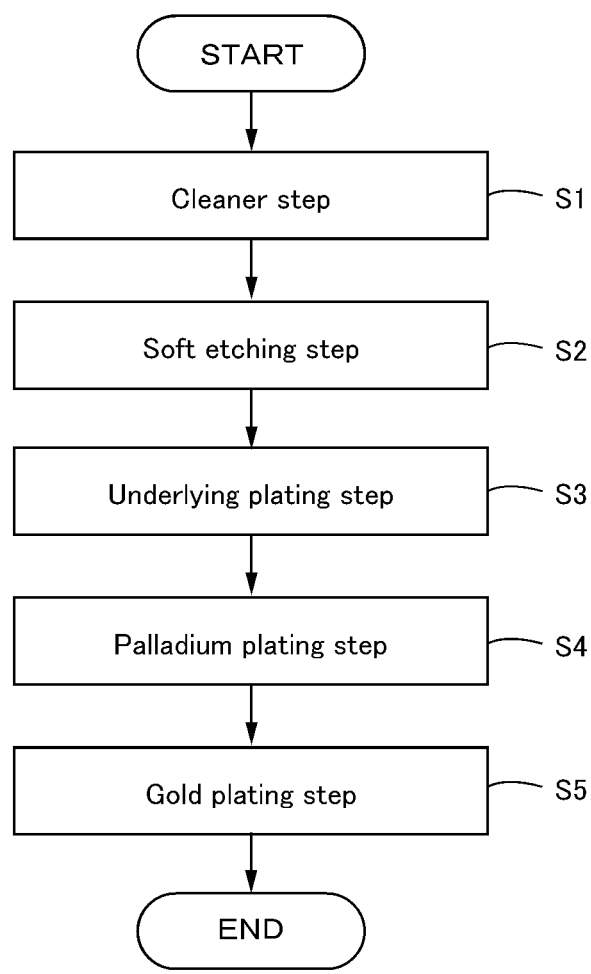

PALLADIUM PLATING SOLUTION AND PLATING METHOD

BACKGROUND OF THE INVENTION

Field of the Invention

The present invention relates to a palladium plating solution and a plating method for improving a bath stability, without decreasing a deposition property. The present application claims priority based on Japanese Patent Application No, 2020-067193 filed in Japan on Apr. 3, 2020, which is incorporated by reference herein.

Description of Related Art

In the past, a palladium film has been used for electronic components, a catalyst, a heat resistant material, or the like, as it shows an excellent electric conductivity, and as it is excellent in a corrosion resistance. In a field of a surface treatment, the palladium film plays an important role in an ENEPIG (method for plating on a copper in an order of an electroless nickel plating, an electroless palladium plating, and a displacement gold plating) process excellent to be used for a soldering or a wire bonding, as for example, the palladium film prevents an underlying metal of nickel from diffusing to a gold surface by a thermal history.

In a plating solution used for an electroless palladium plating, a hypophosphoric acid compound, a boron hydride compound, a formic acid compound, and a hydrazine compound are used as a reducing agent, but as a common problem of a palladium plating solution in the past, a bath stability of a plating is low, and a life span of a bath is short. So, a plating bath in a purpose of improving a stability is proposed.

For example, in Patent Literature 1, about a palladium plating solution, an electroless palladium plating solution using a formic acid as a reducing agent, an aminocarboxylic acid as a complexing agent, and a bivalent sulfur compound as a bath stabilizer, is described.

In addition, in Patent Literature 2, about a palladium plating solution, an electroless palladium plating solution using a sodium hypophosphite or a sodium boron hydride as a reducing agent, an ammonia or an amine compound as a complexing agent, and a bivalent sulfur compound as a bath stabilizer, is described.

Patent Literature 1: JP 3972158 B
Patent Literature 2: JP S62-124280 A

SUMMARY OF THE INVENTION

However, it is required to improve a bath stability without further decreasing a deposition property in future, and in Patent Literature 1, an aminocarboxylic acid is used as a complexing agent, but a bath stability will be insufficient. In addition, in Patent Literature 2, an ammonia or an amine compound is used as a complexing agent, but a sodium hypophosphite or a sodium boron hydride is used as a reducing agent, so a phosphorus or a boron codeposit on a palladium film, so the film will be hard and weak.

Here, the purpose of the present invention is to provide a palladium plating solution and a plating method for improving a bath stability of a palladium plating, without decreasing a deposition property of the palladium plating.

A palladium plating solution relating to one embodiment of the present invention is a palladium plating solution for improving a bath stability, without decreasing a deposition property, comprising: an aqueous palladium compound; one or more complexing agent containing a compound having at least an ethylenediamine or a propylenediamine skeleton; a formic acid or a formate; and a sulfur compound, wherein the palladium plating solution is having two or more sulfide groups in a molecule of the sulfur compound.

In this way, it is possible to improve a bath stability of a palladium plating, without decreasing a deposition property of the palladium plating.

At this time, in one embodiment of the present invention, the sulfur compound may be a compound represented by a general formula in below.

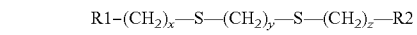

wherein x=1 to 4, y=1 to 3, z=1 to 4,
R1 or R2 is a functional group selected from —OH, —COOH, —CN In this way, the sulfur compound will be more appropriate, and it is possible to improve a bath stability of a palladium plating, without further decreasing a deposition property of the palladium plating.

In addition, in one embodiment of the present invention, a concentration of the sulfur compound may be 0.01 mg/L to 50 mg/L.

In this way, a concentration of the sulfur compound will be more appropriate, and it is possible to improve a bath stability of a palladium plating, without further decreasing a deposition property of the palladium plating.

In addition, in one embodiment of the present invention, a concentration of the complexing agent may be 0.5 g/L to 25 g/L.

In this way, a concentration of the complexing agent will be more appropriate, and it is possible to improve a bath stability of a palladium plating, without further decreasing a deposition property of the palladium plating.

In addition, in one embodiment of the present invention, the complexing agent may be one or more compound containing a compound having at least an ethylenediamine or a propylenediamine represented by a general formula in below.

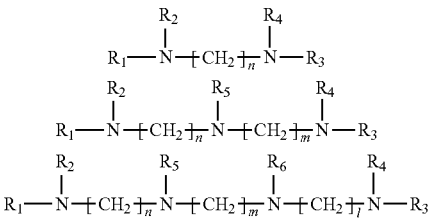

n, m, l = 2~3
$R_1$~$R_6$ is -H, -CH$_3$, -CH$_2$CH$_3$, -CH$_2$CH$_2$-OH, -CH$_2$COOH

In this way, the compound having an ethylenediamine or a propylenediamine skeleton will be most appropriate, and it is possible to improve a bath stability of a palladium plating, without further decreasing a deposition property of the palladium plating.

In addition, other embodiment of the present invention is a plating method using a palladium plating solution for improving a bath stability, without decreasing a deposition property, comprising a palladium plating step for applying a palladium plating on a surface of an underlying metal, wherein a plating solution used for applying the palladium plating comprises: an aqueous palladium salt; one or more complexing agent containing a compound having at least an ethylenediamine or a propylenediamine skeleton; a formic acid or a formate; and a sulfur compound, and the plating solution is having two or more sulfide groups in a molecule of the sulfur compound.

In this way, it is possible to improve a bath stability of a palladium plating, without decreasing a deposition property of the palladium plating.

The underlying metal may be a gold, a nickel, a palladium, a copper, or an alloy thereof, or a combination thereof.

In this way, a palladium plating may be applied to a metal surface of the underlying metal, which is a gold, a nickel, a palladium, a copper, or an alloy thereof, or a combination thereof, and it is possible to improve a bath stability of the palladium plating, without decreasing a deposition property of the palladium plating.

As explained in the above, according to the present invention, it is possible to provide a palladium plating solution and a plating method for improving a bath stability of a palladium plating, without decreasing a deposition property of the palladium plating.

BRIEF DESCRIPTION OF THE DRAWINGS

FIG. 1 is a flow chart illustrating an outline of a plating method relating to other embodiment of the present invention.

DETAILED DESCRIPTION OF THE INVENTION

Hereinafter, explaining in detail about preferred embodiments of the present invention, with reference to the drawings. In addition, the embodiments explained in below will not unjustly limit the content of the present invention described in claims, and it is not limited that all the structures explained in the embodiments are necessary as means for solving the problem of the present invention
[1. Palladium Plating Solution]

A palladium plating solution relating to one embodiment of the present invention can improve a bath stability, without decreasing a deposition property. The palladium plating solution relating to one embodiment of the present invention comprises: an aqueous palladium compound; one or more complexing agent containing a compound having at least an ethylenediamine or a propylenediamine skeleton; a formic acid or a formate; and a sulfur compound, wherein the palladium plating solution is having two or more sulfide groups in a molecule of the sulfur compound.

Here, a plating solution is a solution used for plating, and it means a solution in which various metals and additives are concentrated in one vessel, solutions in which various metals and additives are separated in a plurality of vessels and various metals and additives are concentrated in each vessel, a solution in which an initial make-up of electrolytic bath is prepared in a tank by adjusting the concentrated solution with a water, and a solution in which an initial make-up of electrolytic bath is prepared by adding and adjusting various metals and additives.

The palladium plating solution relating to one embodiment of the present invention is preferably used for a palladium plating solution for applying a gold plating used, for example in an ENEPIG process excellent to be used for a soldering or a wire bonding. In addition, the palladium plating solution is preferably used for an electroless palladium plating bath. And, the palladium plating solution relating to one embodiment of the present invention can obtain an improvement of a stability with respect to a bath decomposition by a sulfur compound contained in the palladium plating solution, so it is possible to improve a bath stability, without decreasing a deposition property of the plating.

Here, considering a productivity of a plating, it is preferable that a deposition speed is fast, but at the same time, there is a risk for a bath decomposition. In order to improve a bath stability, it is known to increase a concentration of the complexing agent, and to use a compound with strong complexing action, but when it is stored for a long time, an amine compound will be altered to be a cause for occurring a decrease in speed of a plating.

Here, the palladium plating solution relating to one embodiment of the present invention can improve a bath stability significantly without decreasing a plating speed, by using one or more complexing agent containing a compound having at least an ethylenediamine or a propylenediamine skeleton, and a sulfur compound having two or more sulfide groups in its molecule in combination. It is important that the complexing agent and the sulfur compound used in the palladium plating solution relating to one embodiment of the present invention are a complexing agent containing a compound having at least an ethylenediamine or a propylenediamine skeleton, and a sulfur compound having two or more sulfide groups. In addition, it is one of features of the present invention that it exerts an effect, even if a concentration of the sulfur compound having two or more sulfide groups is low A preferable concentration is described later.

It is not limited but as the aqueous palladium compound, palladium chloride, palladium sulfate, tetraammine palladium hydrochloride, tetraammine palladium sulfate, or the like is used. Among them, tetraammine palladium hydrochloride and tetraammine palladium sulfate are excellent in a water solubility.

As the complexing agent containing a compound having at least an ethylenediamine or a propylenediamine skeleton, one or more compound containing a compound having at least an ethylenediamine or a propylenediamine represented by a general formula in below is preferable. It is not limited, but an ethylenediamine tetraacetic acid, an ethylenediamine, or the like is used.

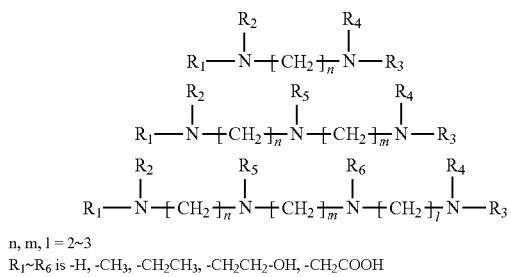

n, m, l = 2~3
$R_1$~$R_6$ is -H, -CH$_3$, -CH$_2$CH$_3$, -CH$_2$CH$_2$-OH, -CH$_2$COOH

As the compound having two or more sulfide groups in a molecule of the sulfur compound, it is preferable to be a compound represented by a general formula in below.

A purpose for adding the sulfur compound is to stabilize a bath.

wherein x=1 to 4, y=1 to 3, z=1 to 4,
R1 or R2 is a functional group selected from —OH, —COOH, —CN As the sulfur compound, it is not limited, but for example, (ethylenedithio) diacetic acid, 3,3'-(ethylenedithio) dipropionitrile, 3,6-dithia-1,8-octanediol, methylenebis (thioglycolic acid), 3,7-dithia-1,9-nonanediol are used.

A concentration of the aqueous palladium salt is preferably 0.1 g/L to 10 g/L, more preferably 0.2 g/L to 5 g/L, further preferably 0.5 g/L to 2 g/L.

A concentration of the complexing agent is preferably 0.5 g/L to 25 g/L, more preferably 1 g/L to 10 g/L, further preferably 3 g/L to 8 g/L. When a concentration of the complexing agent is less than 0.5 g/L, there is a case that a bath stability will be decreased. On the other hand, when a concentration of the complexing agent is more than 25 g/L, there is a case that a deposition speed will be decreased.

A concentration of the formic acid or the formate is preferably 1 g/L to 100 g/L, more preferably 5 g/L to 50 g/L, further preferably 10 g/L to 40 g/L.

A concentration of the sulfur compound is preferably 0.01 mg/L to 0.50 mg/L, more preferably 0.05 mg/L to 5 mg/L, further preferably 0.05 mg/L to 2 mg/L. When a concentration of the sulfur compound is less than 0.01 mg/L, there is a case that a bath stability will be decreased. On the other hand, when a concentration of the sulfur compound is more than 50 mg/L, there is a case that a deposition speed will be decreased. As described in the above, it is possible to exert a bath stability sufficiently, even if a concentration of the sulfur compound is low.

From the above descriptions, according to the palladium plating solution relating to one embodiment of the present invention, it is possible to provide a palladium plating solution for improving a bath stability of a palladium plating, without decreasing a deposition property of the palladium plating.

[2, Plating Method]

Next, explaining about a plating method relating to other embodiment of the present invention. The plating method relating to other embodiment of the present invention is a plating method using the palladium plating solution for improving a bath stability, without decreasing a deposition property. The plating method relating to other embodiment of the present invention comprises at least a palladium plating step S4 for applying a palladium plating on a surface of an underlying metal. As illustrated in FIG. 1, it may comprise an underlying plating step S3 for applying an underlying plating and for forming an underlying metal before the palladium plating step S4, and as a pre-treatment before the underlying plating step S3, it may comprise a cleaner step S1 and a soft etching step S2. In addition, after the palladium plating step S4, it may comprise a gold plating step S5. Explaining about each step in below.

[2-1. Cleaner Step S1]

In the cleaner step S1, a cleaning of a surface of an object to be plated, an improvement of a wettability, and else are performed. In addition, a potential adjustment of a surface of the object to be plated is performed. As a cleaner fluid used in the cleaner step S1, a cationic surfactant, an anionic surfactant, a nonionic surfactant, an amphoteric surfactant, an amine compound, a sulfuric acid, or the like is added. In addition, the amine compound is preferably added when the cleaner fluid is alkaline. In addition, as the object to be plated, for example, a substrate provided with a circuit such as a printed substrate, a package substrate such as BGA-IC, a power module substrate, a resin substrate, or a ceramic substrate, is used.

[2-2. Soft Etching Step S2]

In the soft etching step S2, a metal such as a copper on the object to be plated is dissolved, and a surfactant adsorbed in the cleaner step S1 and oxides on a surface of the metal are removed. As a process liquid used in the soft etching step S2, a sodium persulfate, a hydrogen peroxide, a sulfuric acid, or the like is added. In addition, after the soft etching step S2, an acid washing step (acid washing treatment) for removing oxides remaining on a surface of the metal such as a copper on the object to be plated may be performed.

[2-3. Underlying Plating Step S3]

In the underlying plating step S3, an underlying plating is applied to the object to be plated for forming an underlying metal. A plating in the underlying plating step S3 may be an electrolytic or electroless plating. In addition, as a plating solution used in the underlying plating step S3, a publicly known plating solution is used, and ions in an underlying plating solution are reduced by an electrolysis or a reducing agent such as a hypophosphorous acid or a dimethylamine borane, and the underlying metal is deposited on the object to be plated. The underlying metal may be a gold, a nickel, a copper, a palladium (including which has been performed an activator treatment), a silver, or an alloy thereof, or a combination thereof. Further, the underlying metal is preferably a gold, a nickel, a copper, a palladium (including which has been performed an activator treatment), or an alloy thereof, or a combination thereof. It is not limited, but the underlying metal may be a copper and a gold, a copper and a nickel, or a copper.

[2-4. Palladium Plating Step S4]

In the palladium plating step S4, a palladium plating is applied on a surface of the underlying metal applied in the underlying plating step S3. A plating in the palladium plating step S4 is preferably an electroless palladium plating. In addition, a plating solution used in the palladium plating step S4 comprises: one or more complexing agent containing a compound having at least an ethylenediamine or a propylenediamine skeleton; a formic acid or a formate; and a sulfur compound. Also, it is characterized in that the palladium plating solution is having two or more sulfide groups in a molecule of the sulfur compound. That is, the palladium plating solution described in the above is used. And, the features of the palladium plating solution are as described in the above.

[2-5. Gold Plating Step S5]

In the gold plating step S5, a gold plating is applied on a surface of the palladium plating applied in the palladium plating step S4. A plating in the gold plating step is preferably an electroless gold plating, and as a deposition method, a displacement, a displacement reduction, or a reduction is used. In addition, as a plating solution used in the gold plating step S5, a publicly known plating solution is used, and an aqueous gold cyanide compound, a complexing agent, or the like is used.

From the above descriptions, according to the plating method relating to other embodiment of the present invention, it is possible to provide a plating method for improving a bath stability of a palladium plating, without decreasing a deposition property of the palladium plating.

EXAMPLES

Next, explaining in more detail about a palladium plating solution relating to one embodiment of the present invention and a plating method relating to other embodiment of the present invention by using examples. In addition, the present invention is not limited to these examples.

Example 1

In an example 1, as indicated in Table 1, a cleaner step, a hot water washing step (hot water washing), a soft etching step, an acid washing step, a nickel plating step, and a palladium plating step were performed. As a nickel plating and a palladium plating, an electroless nickel plating of 5 μm and an electroless palladium plating were performed. In addition, between each step, a water washing was performed. Also, as an object to be plated, a BGA substrate made by C. Uyemura & Co., Ltd. and a TEG wafer in which electrodes are composed of a copper were used.

TABLE 1

| Plating process | | Temperature (° C.) | Time (min) |
|---|---|---|---|
| Cleaner step | ACL-007 made by C. Uyemura & Co., Ltd. | 50 | 5 |
| Hot water washing step | Warm ion exchanged water | 50 | 1 |
| Soft etching step | Sodium persulfate 100 g/L Sulfuric acid 20 g/L | 25 | 1 |
| Acid washing step | Sulfuric acid 50 g/L | 25 | 1 |
| Nickel plating step | NPR-4 made by C. Uyemura & Co., Ltd. | 80 | 25 |
| Palladium plating step | Refer to Table 2 | 60 | 5 |

And, a deposition speed of the plating and a bath stability of the plating were evaluated. As a deposition speed (μm/5 min) of the plating, a general deposition speed was confirmed by the BGA substrate made by C. Uyemura & Co., Ltd., and a deposition speed of a fine pad (pad of 100*100 μm) is confirmed by the TEG wafer in which electrodes are composed of a copper. In addition, a film thickness of a palladium plating film was measured by using an X-ray fluorescence measuring device (XDV-μ made by Fischer Instruments). A bath stability was confirmed by confirming an existence of a bath decomposition by visual observation, by rising a liquid temperature after the palladium plating to 80 degrees Celsius as an acceleration test, after applying the electroless palladium plating to the BGA substrate and the TEG wafer in the palladium plating step.

In addition, a decomposition of a bath was confirmed by confirming whether a metal palladium is floating or precipitating in the bath by visual observation. In addition, if the meal palladium is floating or precipitating, it indicates that palladium ions are in a reduced state, and that a plating bath is being unstable.

In addition, in the palladium plating solution, a palladium chloride (2 DI as palladium) was added as an aqueous palladium salt, an ethylenediamine tetraacetic acid (10 g/L) and an ethylenediamine (5 g/L) were added as a complexing agent, a sodium formate (20 g/L) was added as a reducing agent, and (ethylenedithio) diacetic acid (0.3 mg/L) was added as a sulfur compound 1 indicated in Chemical formulas in below. In addition, pH of the palladium plating solution was 6.0, and a temperature of the palladium plating solution was 60 degrees Celsius.

Example 2

In an example 2, in the palladium plating solution, a palladium sulfate (2 g/L as palladium) was added as the aqueous palladium salt, and 3,3'-(ethylenedithio) dipropionitrile (0.5 mg/L) was added as a sulfur compound 2 indicated in Chemical formulas in below. Other than the above, it was similar to the example 1.

Example 3

In an example 3, in the palladium plating solution, a tetraammine palladium hydrochloride (2 g/L as palladium) was added as the aqueous palladium salt, and 3,6-dithia-1,8-octanediol (0.3 mg/L) was added as a sulfur compound 3 indicated in Chemical formulas in below. Other than the above, it was similar to the example 1.

Example 4

In an example 4, in the palladium plating solution, a tetraammine palladium sulfate (2 g/L as palladium) was added as the aqueous palladium salt, and methylenebis (thioglycolic acid) (0.3 mg/L) was added as a sulfur compound 4 indicated in Chemical formulas in below. Other than the above, it was similar to the example 1.

Example 5

In an example 5, in the palladium plating solution, a palladium chloride (2 DI as palladium) was added as the aqueous palladium salt, and 3,7-dithia-4,9-nonanediol (0.5 mg/L) was added as a sulfur compound 5 indicated in Chemical formulas in below. Other than the above, it was similar to the example 1.

Comparative Example 1

In a comparative example 1, in the palladium plating solution, a palladium chloride (2 g/t, as palladium) was added as the aqueous palladium salt, and a sulfur compound was not added. Other than the above, it was similar to the example 1.

Comparative Example 2

In a comparative example 2, in the palladium plating solution, an ethylenediamine tetraacetic acid (10 g/L) and L-aspartic acid (13.3 g/L) were added as the complexing agent, and an ethylenediamine was not added. In addition, a thiodiglycolic acid (30 mu/L) was added as a sulfur compound 6 indicated in Chemical formulas in below Other than the above, it was similar to the example 1.

Comparative Example 3

In a comparative example 3, a thiodiglycolic acid (I mg/L) was added as the sulfur compound 6 indicated in Chemical formulas in below Other than the above, it was similar to the example 1.

Comparative Example 4

In a comparative example 4, a thiodiglycolic acid (5 mg/L) was added as the sulfur compound 6 indicated in Chemical formulas in below Other than the above, it was similar to the example 1.

Comparative Example 5

In a comparative example 5, a thiodiglycolic acid (30 mg/L) was added as the sulfur compound 6 indicated in Chemical formulas in below Other than the above, it was similar to the example 1.

Results of a bath stability (○: the meal palladium is not floating or precipitating, x: the meal palladium is floating or precipitating) and a deposition speed in conditions of the examples 1 to 5 and the comparative examples 1 to 5 are indicated in Table 2. Also, the sulfur compounds added in the examples 1 to 5 and the comparative examples 1 to 5 are indicated in Chemical formulas in below In addition, the sulfur compound 1 in Table 2 indicates a formula 1 in Chemical formulas (same applies to the following sulfur compounds).

TABLE 2

| Composition of palladium plating bath | | | Example 1 | Example 2 | Example 3 | Example 4 | Example 5 | Comparative example 1 | Comparative example 2 | Comparative example 3 | Comparative example 4 | Comparative example 5 |
|---|---|---|---|---|---|---|---|---|---|---|---|---|
| Aqueous palladium compound | Palladium chloride | g/L (As Pd) | 2 | | | | 2 | 2 | 2 | 2 | 2 | 2 |
| | Palladium sulfate | | | 2 | | | | | | | | |
| | Tetraammine palladium hydrochloride | | | | 2 | | | | | | | |
| | Tetraammine palladium sulfate | | | | | 2 | | | | | | |
| Complexing agent | Ethylenediamine tetraacetic aicd | g/L | 10 | 10 | 10 | 10 | 10 | 10 | 10 | 10 | 10 | 10 |
| | Ethylenediamine | | 5 | 5 | 5 | 5 | 5 | 5 | | 5 | 5 | 5 |
| | L-aspartic acid | | | | | | | | 13.3 | | | |
| Reducing agent | Sodium formate | g/L | 20 | 20 | 20 | 20 | 20 | 20 | 20 | 20 | 20 | 20 |
| Sulfur compound | Sulfur compound 1 | mg/L | 0.3 | | | | | | | | | |
| | Sulfur compound 2 | | | 0.5 | | | | | | | | |
| | Sulfur compound 3 | | | | 0.3 | | | | | | | |
| | Sulfur compound 4 | | | | | 0.3 | | | | | | |
| | Sulfur compound 5 | | | | | | 0.5 | | | | | |
| | Sulfur compound 6 | | | | | | | | 30 | 1 | 5 | 30 |
| pH | | | 6.0 | 6.0 | 6.0 | 6.0 | 6.0 | 6.0 | 6.0 | 6.0 | 6.0 | 6.0 |
| Temperature | | deg · C. | 60 | 60 | 60 | 60 | 60 | 60 | 60 | 60 | 60 | .60 |
| Deposition speed to BGA substrate | | μm/5 min | 0.10 | 0.10 | 0.10 | 0.10 | 0.10 | 0.11 | 0.10 | 0.10 | 0.10 | 0.10 |
| Deposition speed to TEG wafer (fine pad) | | μm/5 min | 0.10 | 0.10 | 0.09 | 0.10 | 0.08 | 0.10 | 0.00 | 0.10 | 0.00 | 0.00 |
| Bath stability | | | ○ | ○ | ○ | ○ | ○ | X | X | X | X | X |

[Chemical Formulas]

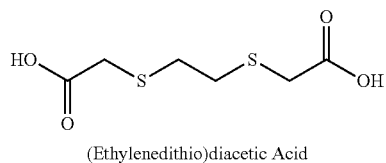

1

(Ethylenedithio)diacetic Acid

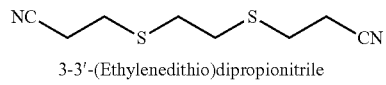

2

3-3'-(Ethylenedithio)dipropionitrile

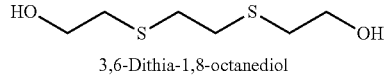

3

3,6-Dithia-1,8-octanediol

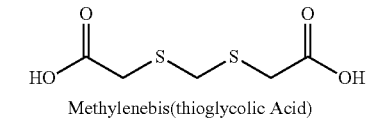

4

Methylenebis(thioglycolic Acid)

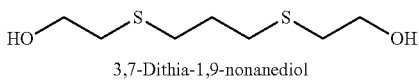

5

3,7-Dithia-1,9-nonanediol

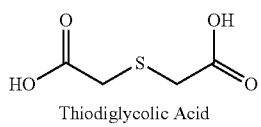

6

Thiodiglycolic Acid

As a result, a deposition property when using the palladium plating solution indicated in the examples 1 to 5 were excellent, as a deposition speed to the BGA substrate were 0.10 μm/15 min, and a deposition speed to the TEG wafer fine pad were 0.08 to 0.10 μm/5 min. On the other hand, a deposition property when using the palladium plating solution indicated in the comparative examples 2, 4 and 5 were not excellent, as a deposition speed to the BGA substrate were 0.10 μm/5 min, but a deposition speed to the TEG wafer fine pad were 0.00 μm/5 min (undeposition). It is considered that this is because a thioglycolic acid added as a bath stabilizer inhibited a deposition. In addition, with respect to a deposition property when using the palladium plating solution indicated in the comparative examples 1 and 3, a deposition speed to the BGA substrate were 0.11 μm/5 min or 0.10 μm/15 min, and a deposition speed to the TEG wafer fine pad were 0.10 μm/15 min, and they were high values, because a bath stability was poor, as a sulfur compound was not added as a bath stabilizer, or as a concentration of the sulfur compound was low.

In addition, with respect to a bath stability when using the palladium plating solution indicated in the examples, the palladium plating solution indicated in the examples 1 to 5 showed an excellent bath stability, as there was no bath decomposition in an elevated temperature acceleration test of 80 degrees Celsius. On the other hand, a bath stability when using the palladium plating solution indicated in the comparative examples 1 to 0.5 were not excellent as a bath decomposition occurred as metal palladiums were floating or precipitating in the bath. It is considered that this is because a bath stability is low as two or more sulfide groups do not exist in a molecule of the sulfur compound.

When there is one sulfide group, it is necessary to increase an addition amount of a sulfur compound compared to the sulfur compound having two sulfide groups, in order to obtain a bath stability effect. However, when the addition amount is increased, a deposition property to the TEG wafer fine pad will be decreased, so it is difficult to achieve both of a bath stability and a deposition property. Here, according to the palladium plating solution and the plating method relating to the present embodiment, it comprises one or more complexing agent containing a compound having at least an ethylenediamine or a propylenediamine, and a sulfur compound having two or more sulfide groups in a molecule, so it was possible to improve to an excellent bath stability, without deceasing not only a general deposition speed, but also a deposition speed to the fine pad.

In addition, it is explained in detail about each embodiment and each example of the present invention as the above, but it can be understood easily for those who skilled in the art that various modifications can be made without practically departing from new matters and effect of the present invention. Therefore, all such variants should be included in the scope of the present invention.

For example, terms described with different terms having broader or equivalent meaning at least once in description and drawings can be replaced with these different terms in any part of description and drawings in addition, operation and configuration of the palladium plating solution and the plating method are not limited to those explained in each embodiment and each example of the present invention, and various modifications can be made.

Glossary of Drawing References

S1 Cleaner step
S2 Soft etching step
S3 Underlying plating step
S4 Palladium plating step
S5 Gold plating step

The invention claimed is:

1. A palladium plating solution for improving a bath stability, without decreasing a deposition property, comprising:
an aqueous palladium compound;
one or more complexing agent containing a compound having at least an ethylenediamine or a propylenediamine skeleton;
formic acid or a formate; and
a sulfur compound, wherein a concentration of the sulfur compound is between 0.01 mg/L to 0.8 mg/L, inclusive of the range endpoints, and
wherein the sulfur compound has two or more sulfide groups in a molecule.

2. The palladium plating solution according to claim 1, wherein the sulfur compound is a compound represented by a general formula in below:

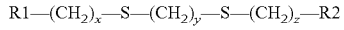

wherein x=1 to 4, y=1 to 3, z=1 to 4,
R1 or R2 is a functional group selected from a group consisting of —OH, —COOH, and —CN.

3. The palladium plating solution according to claim 1, wherein a concentration of the sulfur compound is 0.01 mg/L to 0.7 mg/L, inclusive of the range endpoints.

4. The palladium plating solution according to claim 1, wherein a concentration of the complexing agent is 0.5 g/L to 25 g/L.

5. The palladium plating solution according to claim 1, wherein the complexing agent is one or more compounds having at least an ethylenediamine or a propylenediamine represented by a general formula in below:

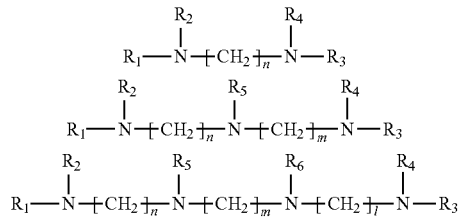

where:
n, m, l=2 or 3
$R_1$ or $R_2$ or $R_3$ or $R_4$ or $R_5$ or $R_6$ is selected from a group consisting of —H, —$CH_3$, —$CH_2CH_3$, —$CH_2CH_2$—OH, and —$CH_2COOH$.

6. A plating method using a palladium plating solution for improving a bath stability, without decreasing a deposition property, comprising a palladium plating step comprising applying a palladium plating solution of claim 1 on to a surface of an underlying metal.

7. The plating method according to claim 6, wherein the underlying metal is a gold, a nickel, a palladium, a copper, or an alloy thereof, or a combination thereof.

* * * * *